US012657341B2

(12) United States Patent
Moti Yung et al.

(10) Patent No.: US 12,657,341 B2
(45) Date of Patent: Jun. 16, 2026

(54) USING MULTI-PARTY COMPUTATION AND K-ANONYMITY TECHNIQUES TO PROTECT CONFIDENTIAL INFORMATION

(71) Applicant: Google LLC, Mountain View, CA (US)

(72) Inventors: Marcel M. Moti Yung, New York, NY (US); Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 718 days.

(21) Appl. No.: 17/918,598

(22) PCT Filed: Apr. 21, 2021

(86) PCT No.: PCT/US2021/028354
§ 371 (c)(1),
(2) Date: Oct. 13, 2022

(87) PCT Pub. No.: WO2022/031329
PCT Pub. Date: Feb. 10, 2022

(65) Prior Publication Data
US 2023/0144140 A1 May 11, 2023

(30) Foreign Application Priority Data
Aug. 2, 2020 (IL) .......................................... 276440

(51) Int. Cl.
*H04L 29/06* (2006.01)
*G06F 21/62* (2013.01)
*H04L 9/08* (2006.01)

(52) U.S. Cl.
CPC ........ *G06F 21/6254* (2013.01); *H04L 9/0825* (2013.01); *H04L 2209/46* (2013.01)

(58) Field of Classification Search
None
See application file for complete search history.

(56) References Cited

U.S. PATENT DOCUMENTS 10,424,034 B1 * 9/2019 Wang .................. G06F 21/6263
10,547,592 B2 1/2020 Bellala et al.
(Continued)

FOREIGN PATENT DOCUMENTS

EP 3477527 5/2019
JP 2013-084063 5/2013
(Continued)

OTHER PUBLICATIONS

Notice of Allowance in Japanese Appln. No. 2022-568895, mailed on Mar. 18, 2024, 5 pages (with English translation).
(Continued)

*Primary Examiner* — Eleni A Shiferaw
*Assistant Examiner* — Hassan A Hussein
(74) *Attorney, Agent, or Firm* — Fish & Richardson P.C.

(57) ABSTRACT

This disclosure relates to protecting the confidential information of multiple entities using secure multi-party computation (MPC) and k-anonymity techniques. In some aspects, a method includes receiving, by a first MPC computing system from a client device, a content request including encrypted user group identifiers. Each encrypted user group identifier is encrypted using a first encryption key of a second MPC computing system. For each encrypted user group identifier, a request is transmitted to the second MPC computing system. The request includes the encrypted user group identifier. For each user group identifier that satisfies a k-anonymity, the first MPC computing system receives, from the second MPC computing system, a plaintext value of the user group identifier. The first MPC computing system transmits a selection parameter request to one or more platforms. The selection parameter request includes the plaintext value of the user group identifier.

20 Claims, 4 Drawing Sheets

(56)        References Cited

U.S. PATENT DOCUMENTS

| | | | |
|---|---|---|---|
| 2015/0019323 A1* | 1/2015 | Goldberg | G06Q 30/0242 |
| | | | 705/14.41 |
| 2015/0095104 A1* | 4/2015 | Goldberg | G06F 21/6254 |
| | | | 705/7.29 |
| 2015/0134446 A1* | 5/2015 | Castelli | G06Q 30/0251 |
| | | | 705/14.49 |
| 2017/0026345 A1* | 1/2017 | Salek | H04W 12/033 |
| 2018/0012032 A1* | 1/2018 | Radich | H04L 9/30 |
| 2018/0083976 A1* | 3/2018 | Egan | H04L 63/104 |
| 2018/0096166 A1* | 4/2018 | Rogers | G06F 16/951 |
| 2018/0122136 A1* | 5/2018 | Lynen | G06T 17/05 |
| 2018/0123802 A1* | 5/2018 | Graul | H04L 63/0428 |
| 2018/0322170 A1* | 11/2018 | Alberton | G06F 16/24568 |
| 2019/0079944 A1* | 3/2019 | VanBlon | G06F 16/119 |
| 2019/0335327 A1* | 10/2019 | Al-Kabra | G06F 16/9566 |
| 2020/0074112 A1* | 3/2020 | Ren | G06F 16/9027 |
| 2020/0074552 A1* | 3/2020 | Shier | G06Q 20/10 |
| 2020/0342459 A1* | 10/2020 | Boyle | G06Q 20/16 |
| 2020/0380166 A1* | 12/2020 | Kane | G06F 21/6245 |
| 2021/0165898 A1* | 6/2021 | Weiss | H04L 9/0861 |
| 2021/0167954 A1* | 6/2021 | Weiss | H04L 9/0861 |
| 2021/0182429 A1* | 6/2021 | Chen | H04L 51/10 |
| 2021/0240854 A1* | 8/2021 | Krafcik | G06F 21/6227 |
| 2022/0414714 A1* | 12/2022 | Maher | G06Q 30/0276 |

FOREIGN PATENT DOCUMENTS

| | | |
|---|---|---|
| JP | 2014-170369 | 9/2014 |
| JP | 2023-527709 | 6/2023 |
| KR | 10-2022-0110280 | 8/2022 |
| WO | WO 2012165518 | 12/2012 |
| WO | WO 2019/194811 | 10/2019 |

OTHER PUBLICATIONS

Office Action in Indian Appln. No. 202227058844, mailed on May 16, 2024, 3 pages (with English translation).

Davidson Cloudfare Portugal, "Privacy Pass: Architectural Framework; draft-davidson-pp-architecture-01.txt," Jul. 13, 2020, retrieved on Jul. 13, 2020, retrieved from URL <https://tools.ietf.org/html/draft-davidson-pp-architecture-01>, 22 pages.

Github.com [online], "Aggregated Reporting API" Oct. 2019, retrieved on Dec. 28, 2022, retrieved from URL <https://github.com/csharrison/aggregate-reporting-api>, 6 pages.

Github.com [online], "Pigin" Aug. 2019, retrieved on Dec. 28, 2022, retrieved from URL <https://github.com/michaelkleber/pigin>, 8 pages.

Github.com [online], "trust token api" Aug. 2019, retrieved on Dec. 28, 2022, retrieved from URL <https://github.com/WICG/trust-token-api>, 13 pages.

Github.com [online], "TurtlelDove" Jan. 2020, retrieved on Dec. 28, 2022, retrieved from URL <https://github.com/WICG/turtledove>, 2 pages.

Github.com [online], "Webpackage" Oct. 2016, retrieved on Dec. 28, 2022, retrieved from URL <https://github.com/WICG/webpackage>, 4 pages.

International Search Report and Written Opinion in International Appln. No. PCT/US2021/028354, mailed on Jul. 19, 2021, 18 pages.

Wikipedia.org [online], "Secure multi-party computation" May 2004, retrieved on Dec. 28, 2022, retrieved from URL <https://en.wikipedia.org/wiki/Secure_multi-party_computation>, 13 pages.

Wikipedia.org [online], "Semantic security" Sep. 2004, retrieved on Dec. 28, 2022, retrieved from URL <https://en.wikipedia.org/wiki/Semantic_security>, 3 pages.

Office Action in Israeli Appln. No. 276440, dated Jan. 24, 2023, 4 pages.

International Preliminary Report on Patentability in International Appln. No. PCT/US2021/028354, mailed on Feb. 16, 2023, 12 pages.

Notice of Allowance in Korean Appln. No. 10-2022-7039403, mailed on Mar. 6, 2025, 5 pages (with English translation).

Office Action in Indian Appln. No. 202227058844, dated Jul. 20, 2023, 7 pages (with English translation).

Office Action in Japanese Appln. No. 2022-568895, mailed on Dec. 11, 2023, 4 pages (with English translation).

Office Action in European Appln. No. 21724154.6, mailed on Jun. 18, 2025, 11 pages.

Office Action in Korean Appln. No. 10-2022-7039403, mailed on Jul. 9, 2024, 10 pages (with English translation).

Office Action in Chinese Appln. No. 202180034297.1, mailed on Jul. 30, 2024, 16 pages (with English translation).

* cited by examiner

400

Processor
410

420

Memory

450

Storage
Device

430

440

Input/Output

460

External
Devices

USING MULTI-PARTY COMPUTATION AND K-ANONYMITY TECHNIQUES TO PROTECT CONFIDENTIAL INFORMATION

CROSS REFERENCE TO RELATED APPLICATIONS

This application is a National Stage Application under 35 U.S.C. § 371 and claims the benefit of International Application No. PCT/US2021/028354, filed Apr. 21, 2021, which claims priority to IL Application No. 276440, filed Aug. 2, 2020. The disclosures of the foregoing applications are hereby incorporated by reference in their entirety.

BACKGROUND

Multi-party computation is a cryptographic technique that distributes computation across multiple parties such that each party does not have access to other parties' data. K-anonymity techniques can be used to ensure that data for each member of a group is anonymous. For data to have the k-anonymity property, the data for a member cannot be distinguished from the data for $k-1$ other members of the group.

SUMMARY

This specification describes technologies relating to protecting the confidential information of multiple entities using multi-party computation (MPC) and k-anonymity techniques.

In general, one innovative aspect of the subject matter described in this specification can be embodied in methods that include receiving, by a first multi-party computation (MPC) computing system and from a client device, a content request including a set of encrypted user group identifiers, where each encrypted user group identifier is encrypted using a first encryption key of a second MPC computing system; for each encrypted user group identifier, transmitting a request to the second MPC computing system, the request comprising the encrypted user group identifier; for each user group identifier that satisfies a k-anonymity process performed by the second MPC computing system: receiving, by the first MPC computing system from the second MPC computing system, a plaintext value of the user group identifier; and transmitting, by the first MPC computing system, a selection parameter request to one or more platforms, the selection parameter request comprising the plaintext value of the user group identifier; receiving, by the first MPC computing system and from the second MPC computing system, a set of selection parameter elements that each comprise a creative element for a corresponding digital component and a selection parameter identifier for the digital component; selecting, by the first MPC computing system, a given digital component based on the selection parameter identifiers; and transmitting, by the first MPC computing system and to the client device, the creative element for the digital component. Other implementations of this aspect include corresponding apparatus, systems, and computer programs, configured to perform the aspects of the methods, encoded on computer storage devices.

These and other implementations can each optionally include one or more of the following features. In some aspects, the content request includes a resource locator for a resource for which a digital component is being requested. Some aspects can include generating, by the first MPC computing system, a request identifier based on the resource locator and a nonce corresponding to the content request and encrypting, by the first MPC computing system, the request identifier. The request can include the encrypted request identifier.

In some aspects, receiving the plaintext value of each user group identifier that satisfies the k-anonymity process can include receiving a return request for each user group identifier that satisfies the k-anonymity process. Each return request can include the user group identifier and a twice-encrypted request identifier encrypted generated by the second MPC computing system by encrypting the encrypted request identifier using a second encryption key of the second MPC computing system. Each selection parameter request can include the twice-encrypted request identifier. Each selection parameter element can include the encrypted request identifier generated by the second MPC computing system by decrypting the twice-encrypted request identifier after receiving, from a platform, the twice-encrypted request along with the creative element and the selection parameter identifier of the selection parameter element.

In some aspects, the second MPC computing system receives, from each of the one or more platforms, a selection parameter response including the twice-encrypted request identifier, a respective creative element for a respective digital component, a selection parameter for the respective digital component, and a digital component provider identifier that publishes the respective digital component. The second MPC computing system identifies, for each selection parameter response, a corresponding selection parameter identifier based on a range of selection parameter values in which the selection parameter of the selection parameter is included. The second MPC computing system generates the selection parameter elements based on the selection parameter responses and the selection parameter identifiers.

In some aspects, the content request includes, for each user group identifier, an encrypted composite message. The encrypted composite message can include an encrypted version of a composite message comprising the user group identifier, an application public key for an application of the client device that initiated the content request and a Signed Redemption Record issued by a trust token issuer in response to determining that the client device is trustworthy.

In some aspects, the content request includes contextual signals. Some aspects can include determining that the contextual signals satisfy k-anonymity. In response to determining that the contextual signals satisfy k-anonymity, the first MPC computing system encrypts the contextual signals. The first MPC computing system includes, in the request, each contextual signal that satisfies k-anonymity.

Some aspects can include identifying, in each creative element, a first set of properties for the corresponding digital component and identifying, in a lookup table, a second set of excluded properties excluded by a publisher of the resource. Selecting, by the first MPC computing system, a given digital component based on the selection parameter can include determining, for each creative element, whether one or more properties in the first set of properties for the creative element matches an excluded property and excluding each creative element having at least one property that matches an excluded property.

In some aspects, selecting, by the first MPC computing system, a given digital component based on the selection parameter identifiers can include, for each selection parameter element, identifying, in a first lookup table, a share code for the creative element of the selection parameter element based on a resource locator for a resource and a digital component identifier to a digital component provider that publishes the corresponding digital component of the creative element, identifying, in second lookup table, a publisher return identifier based on the share code and the selection parameter identifier of the selection parameter element, and selecting, as the given digital component, a digital component of a given selection parameter element having a highest publisher return identifier.

In some aspects, transmitting, by the first MPC computing system and to the client device, the creative element for the digital component can include transmitting a content request result including the creative element, the publisher return identifier for the given selection parameter element, the digital component provider identifier for the given digital component, a timestamp indicating a time at which the given digital component was selected, and a digital signature.

In some aspects, the client device transmits a second content request to a second platform. The second content request result can include the content result request and additional contextual signals. The second platform selects a second digital component for presentation at the client device from among a set of digital components comprising the given digital component and one or more digital components selected based on the additional contextual signals.

The subject matter described in this specification can be implemented in particular embodiments so as to realize one or more of the following advantages. Using MPC and k-anonymity techniques to perform content selection processes prevents confidential, e.g., personal, information of the entities that participate in the process from being leaked to other entities and prevents sharing of confidential information between the entities that would otherwise be necessary to perform the process. The techniques described in this document compartmentalize the confidential information and operations of the process within different computing systems to ensure that, if a computer of one entity is compromised, the amount of confidential information that can be accessed is minimized or at least reduced relative to other techniques.

The MPC techniques described in this document use multiple lookup tables maintained by the multiple computing systems that participate in the MPC process to protect the confidentiality of the information in the tables. The tables can include codes in place of actual data such that the computing systems that participate in the MPC process do not have access to the underlying data, but can still perform the operations of the process using these codes. Using codes in place of actual data also protects the data even if the data is compromised, e.g., stolen or leaked to another entity. Using lookup tables and codes in this way reduces the computational burden on the computing systems used to implement the MPC process relative to encryption techniques (e.g., homomorphic encryption techniques) that would otherwise be required to protect the data. This reduces the necessary central processing unit (CPU) cycles required to perform the process (e.g., by not having to encrypt and decrypt large amounts of data), reduces the latency in performing the process which is critical for implementations in which the process is used to select content for provision to and presentation on user devices, and makes the overall process more efficient.

Reducing the latency in content provision also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration. Batching techniques can also be used to reduce the computational requirements (e.g., for handling a greater number of individual requests) and reduce bandwidth consumption of a network that connects the computing systems of the various entities.

Using the combination of MPC, k-anonymity, probabilistic encryption, and lookup tables as described in this document provides a synergistic effect of protecting the confidentiality of the data of each of the entities involved in the process of requesting content, providing candidate content for potential selection and selection parameters for the candidate content, selecting the content, and providing the content for presentation. This includes protecting the confidentiality of user data of a user to which content is being provided, the confidentiality of selection parameters submitted by platforms (e.g., DSPs) for candidate content, and the way in which platforms (e.g., SSPs) select content.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems that employ MPC, k-anonymity techniques, and other types of encryption to prevent the sharing or leakage of confidential information of each entity involved in the selection and distribution of electronic content to client devices. Digital signature techniques can also be used to detect and prevent fraud in data transmissions.

Figure 1:
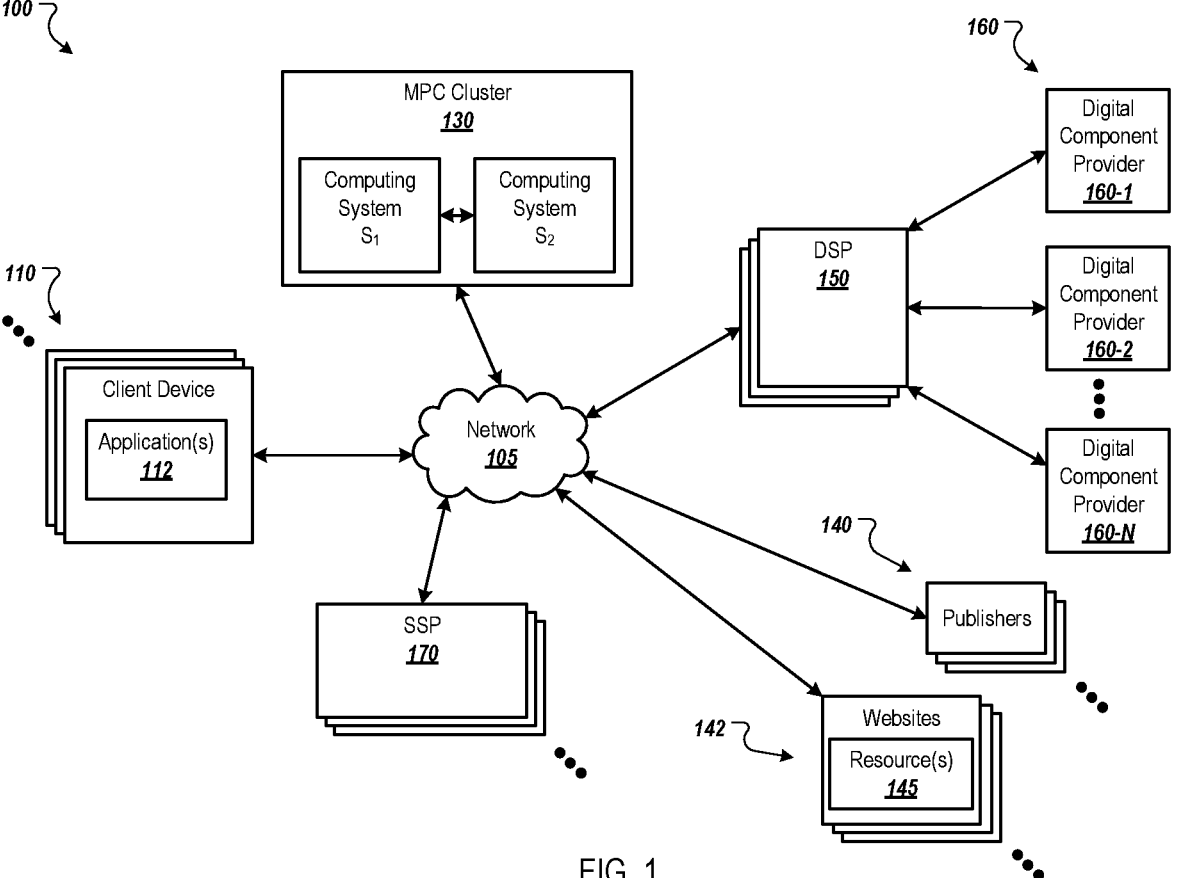
FIG. 1 is a block diagram of an environment in which content is distributed to client devices.

FIG. 1 is a block diagram of an environment 100 in which content is distributed to client devices 110. The example environment 100 includes a data communication network 105, such as a local area network (LAN), a wide area network (WAN), the Internet, a mobile network, or a combination thereof. The network 105 connects the client devices 110, an MPC cluster 130, demand-side platforms (DSPs) 150, supply-side platforms (SSPs) 170, publishers 140, and websites 142. The example environment 100 may include many different client devices 110, MPC clusters 130, DSPs 150, SSPs 170, publishers 140, and websites 142.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. An SSP 170 can interact with one or more DSPs 150 to obtain information that can be used to select a digital component for a digital component slot. As described in more detail below, this information can include a selection parameter that represents an amount that a digital component provider 160 is willing to provide to the publisher 140 for presentation of a digital component of the digital component provider 160. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple SSPs 170 on behalf of digital component providers 160 to provide digital components for presentation with the resources and/or applications of multiple different publishers 140. In general, a DSP 150 can receive requests for digital components (e.g., from an SSP 170 directly or by way of an exchange), generate (or select) a selection parameter for one or more digital components created by one or more digital component providers based on the request, and provide data related to the digital component (e.g., the digital component itself) and the selection parameter to an SSP 170.

The ways in which SSPs 170 select digital components and the ways in which DSPs 150 distribute digital components (e.g., generate selection parameters and/or the selection parameters themselves) generally include confidential information that should not be shared with other parties. The techniques described in this document protect this information from being shared or leaked to other parties.

In some cases, it is beneficial to a user to receive digital components related to web pages, application pages, or other electronic resources previously visited and/or interacted with by the user. In order to distribute such digital components to users, the users can be assigned to user groups when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160.

To protect user privacy, a user's group membership can be maintained at the user's client device 110, e.g., by one of the applications 112, rather than by a digital component provider or other party. In a particular example, a web browser can maintain a list of user group identifiers ("user group list") for a user using the web browser. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely. As described in more detail below, the application 112 can send the user group identifiers in the user group list to the MPC cluster 130 along with a request for content, e.g., a request for one or more digital components. Rather than send the plaintext values of the user group identifiers, the application 112 can encrypt the user group identifiers and send the encrypted user group identifiers to the MPC cluster 130 so that unintended recipients of the user group identifiers cannot access the plaintext values of the user group identifiers.

The MPC cluster 130 includes multiple computing systems that perform a multi-party computation process to select a digital component based on one or more user group identifiers and additional information. In this example, the MPC cluster 130 includes a first computing system $S_1$ and a second computing system $S_2$. The computing systems $S_1$ and $S_2$ can be owned and operated by the same party (e.g., a browser developer, application developer, or industry group) or by different parties (e.g., one operated by a browser developer and the other operated by an industry group). Other quantities of computing systems can also be used as long as the quantity is greater than one.

Using MPC to select a digital component based on user group identifiers protects the privacy of the user by preventing any party (including the party operating the computing systems of the MPC cluster 130) from determining to which groups the user belongs, thereby protecting personal information of the user. The MPC process, along with k-anonymity techniques also prevents other parties from accessing the confidential information of the SSPs 170 and the DSPs 150. The k-anonymity techniques can also prevent the DSPs 150 and/or digital component providers 160 from micro-targeting a particular client device 110, e.g., by using specific user information of the user to select digital components for the user. Example processes for using MPC, k-anonymity techniques, and other encryption techniques for selecting and distributing content are illustrated in FIGS. 2 and 3.

In some implementations, an application 112 can provide a user interface that enables a user to manage the user groups to which the user is assigned. For example, the user interface can enable the user to remove user group identifiers, prevent all or particular resources, publishers, digital component providers, digital component exchanges, and/or DSPs 150 from adding the user to a user group (e.g., prevent the entity from adding user group identifiers to the list of user group identifiers maintained by the application 112). This provides better transparency and control for the user.

Figure 2:
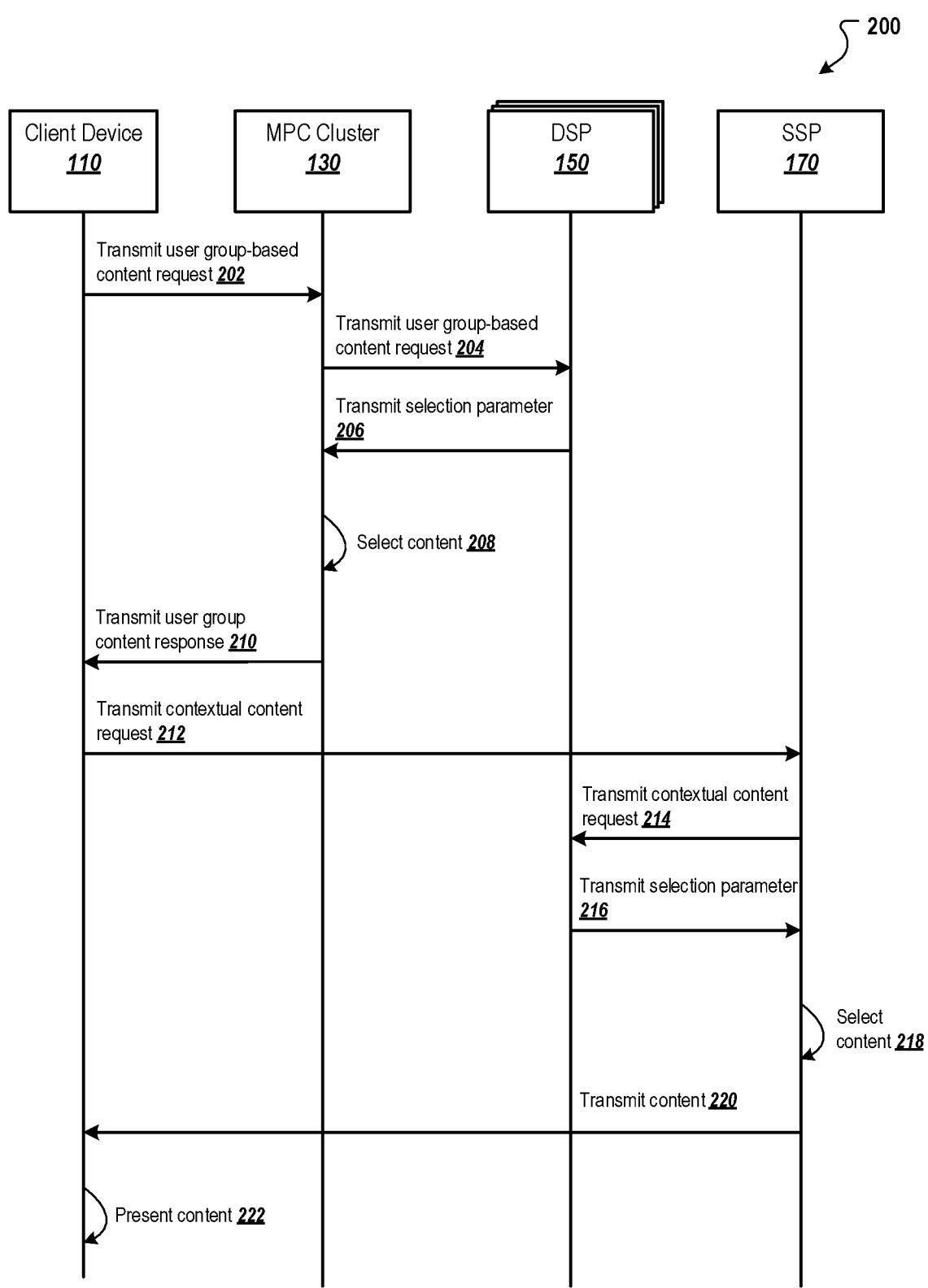
FIG. 2 is a swim lane diagram that illustrates an example process for selecting and providing content to a client device.
Figure 3:
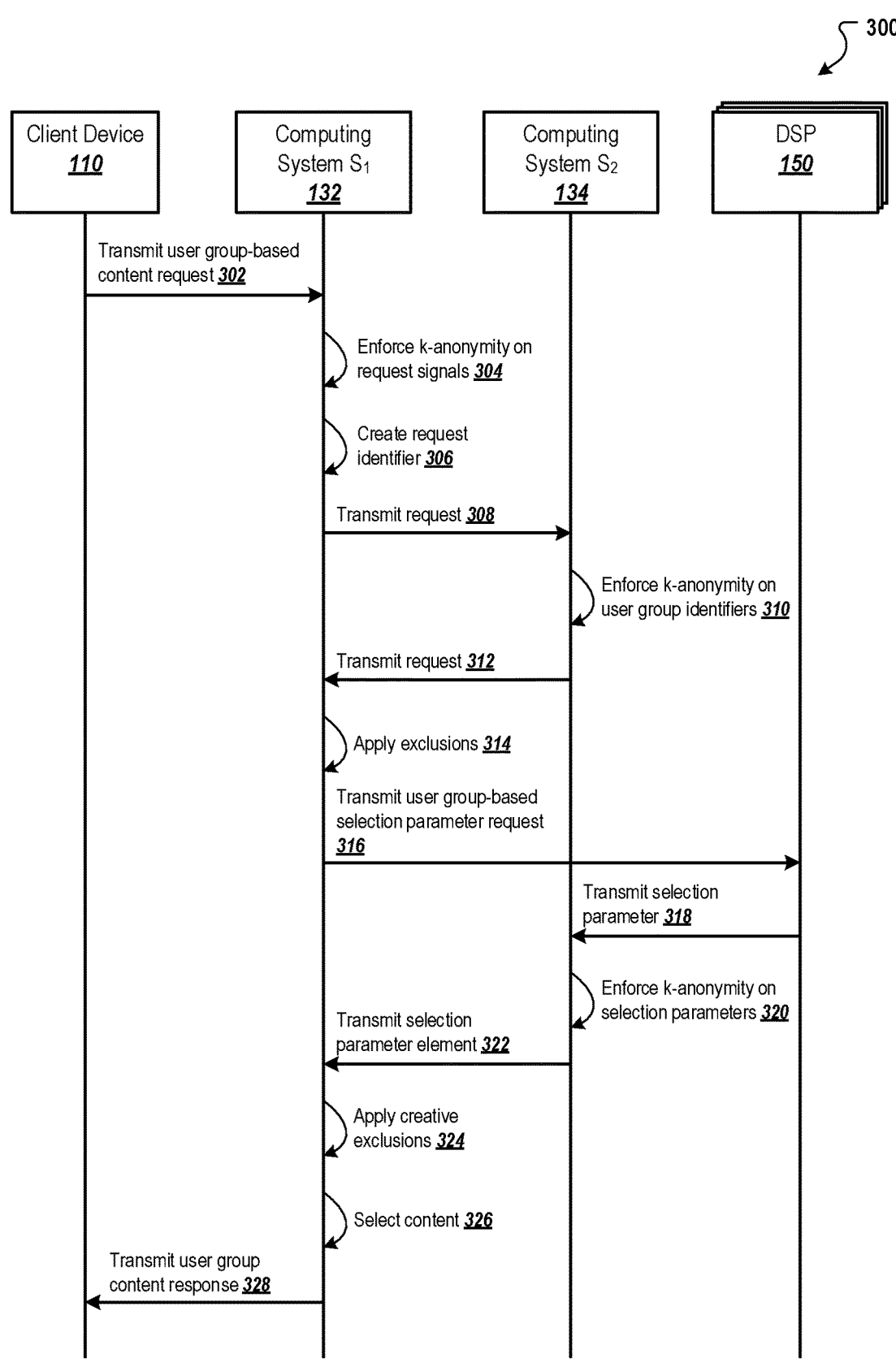
FIG. 3 is a swim lane diagram that illustrates an example process for selecting content.

FIG. 2 is a swim lane diagram that illustrates an example process 200 for selecting and providing content to a client device 110. Operations of the process 200 can be implemented, for example, by the client device 110, the MPC cluster 130, one or more DSPs 150, and an SSP 170. Operations of the process 200 can also be implemented as instructions stored on one or more computer readable media which may be non-transitory, and execution of the instructions by one or more data processing apparatus can cause the one or more data processing apparatus to perform the operations of the process 200.

In this example, the SSP 170 is the SSP used by a particular publisher to manage the process of obtaining digital components for digital component slots of its resources and/or applications and the client device 110 requests content in response to an application of the client device 110 loading an electronic resource (e.g., web page or native application) of the publisher. The SSP 170 can review digital components prior to enabling the digital components to be provided for presentation with electronic resources of the publishers for which the SSP 170 obtains digital components. For example, the SSP 170 can review the content and format of a digital component to ensure that it meets various criteria, e.g., does not include particular types of content, meets data and/or display size requirements, etc.

If the SSP 170 approves a digital component, the SSP 170 can generate a signed creative element for the digital component. The signed creative element can include a set of content and a digital signature generated based on the set of content. For example, the set of content can include a creative snippet, a digital component provider identifier that uniquely identifies the digital component provider that created and/or publishes the digital component (which allows the SSP 170 to determine the corresponding DSP 150 for the digital component), creative metadata, a resource locator for the SSP 170, and/or an expiration date for the digital signature (e.g., to require DSPs to resubmit digital components periodically for reverification).

The creative snippet can include the digital component itself (or a resource locator or link to a server from which the digital component can be downloaded). The creative snippet can also include computer-executable code for rendering the digital component, e.g., a script to download the digital component from a server and render the digital component in a digital component slot. The creative snippet can also include computer-executable code for transmitting information about a presentation of the digital component to an aggregation server, e.g., a script that causes a client device to transmit the information to an aggregation server.

The resource locator for the SSP 170 can be the eTLD+1 for a domain of the SSP 170. The eTLD+1 is the effective top-level domain (eTLD) plus one label more than the public suffix. An example eTLD+1 is "example.com" where ".com" is the top-level domain.

The metadata can include a set of properties that enable the SSP 170 to enforce publisher-defined exclusions on digital components. For example, a publisher may not allow digital components having particular properties (e.g., having content related to particular categories) to be presented with its resources. The metadata can include a list of prohibited categories, topics, or other properties of digital components that are prohibited by the publisher. In some implementations, the SSP 170 can encrypt each property and include each encrypted property in the signed creative element. For example, the SSP 170 can encrypt each property using an asymmetric public key of the SSP 170. In this way, only the SSP 170 can access the plaintext value of each property using the asymmetric private key corresponding to the public key. As described below, the MPC cluster 130 can use the properties (e.g., in encrypted form) to exclude digital components for the publisher. If the properties are encrypted, the MPC cluster 130 can still perform the exclusions while being unable to determine which properties the publisher excludes, thereby protecting confidential information of the publisher.

The SSP 170 can create the digital signature by signing over the set of content using an asymmetric private key of the SSP 170. Recipients of the signed creative element can verify the digital signature using an asymmetric public key corresponding to the private key used to generate the signature. If any piece of data changes in the set of content after the digital signature is generated, the verification of the digital signature will fail. The SSP 170 can send the signed creative element for each digital component to the DSP 150 for the digital component provider 160 that created/published the digital component.

The client device 110 transmits a user group-based content request to the MPC cluster 130 (202). For example, a web browser running on the client device 110 can load a resource of a publisher having one or more digital component slots. In another example, a user may launch a native application of a publisher and the content of the application may include one or more digital component slots. The application 112 that includes the digital component slots can transmit the user group-based content request.

In this example process 200, the application 112 can transmit two separate content requests. The application 112 can first transmit a user group-based content request to request a digital component based on one or more user groups to which the user of the client device 110 is assigned. The application 112 can then send a contextual content request that requests a digital component based on additional contextual information and, if one is obtained using the user-group based content request, one or more digital components selected based on the one or more user groups. This enables the contextual content selection process to include digital components selected based on the one or more user groups while maintaining the confidentiality of the user groups to which the user is assigned and the confidentiality of the information of the DSPs used to select the digital components.

The user group-based content request can include some contextual signals, but fewer than what is included in the contextual content request described below. For example, the user-group content request can include a resource locator for the resource, e.g., a Universal Resource Locator (URL) for a web page or Universal Resource Identifier (URI) for application content. The user-group content request can also include a language (e.g., the language in which content is presented by the application rendering the content) and/or coarse geographic location information indicating a coarse location of the client device 110.

The user group-based content request can also include the user group identifiers for the user groups to which the user of the client device 110 is assigned. As described in more detail below, the user group-based content request can include encrypted user group identifiers and Signed Redemption Records (SRR) to protect user privacy and prevent fraud. An SRR indicates that the client device has been evaluated by a trust token issuer and determined to be trustworthy.

The MPC cluster 130 receives the user group-based content request and transmits a corresponding user group-based content request to one or more DSPs 150 (204). After receiving the user group-based content request, the MPC cluster 130 can verify the SRR(s). The MPC cluster 130 can also enforce k-anonymity on various information included in the request and perform an MPC process that includes transmitting the user group-based request to the DSP(s) 150, receiving a selection parameter from the DSP(s) 150 (206), and selecting content (e.g., one or more digital components) based on the selection parameters (208). These operations are described in more detail below with reference to FIG. 3.

The MPC cluster 130 transmits a user group content response for the selected content to the application 112 (210). The MPC cluster 130 can select a digital component and transmits to the application 112, a user group content response that includes at least the signed creative element for the selected digital component. This digital component can also be referred to as a user group-based digital component as the digital component is selected based on the user group membership of the user.

In some implementations, the user group content response includes a set of content that includes the signed creative element for the user group-based digital component, a publisher return identifier, a selection parameter identifier (described below), a digital component provider identifier that uniquely identifies the digital component provider that created/published the user group-based digital component, and/or a timestamp indicating a time at which the content selection process was performed to select the user group-based digital component (which can be a high resolution timestamp with millisecond, or finer, granularity). The user group content response can also include a digital signature generated by the computing system $S_1$ of the MPC cluster 130 over a cryptographic hash (e.g., SHA256) of the signed creative element, the resource locator for the resource with which a digital component will be presented, the publisher return identifier, the selection parameter identifier, the digital component identifier, and the timestamp. The computing system $S_1$ can generate the digital signature using a private key of the computing system $S_1$.

Generating the digital signature of the cryptographic hash of the signed creative element rather than the signed creative element itself reduces the data size required to validate the signature and the processing power (e.g., number of CPU cycles) required to validate the digital signature. The reduced data size can increase data transmission speeds, reduce bandwidth consumption, and reduce data storage requirements. If the digital signature is over the entire creative element, a recipient that wants to validate the signature must somehow receive the creative element in its entirety, which is much bigger than the cryptohash of the creative element.

The timestamp serves as a unique identifier for the selection process and the digital signature can be used to prevent fraud. The combination of the unique identifier for the selection process and the digital signature prevent compromised/malicious applications (e.g., browsers) or scripts from committing fraud by falsifying selection parameters or launching replay attacks (e.g., denial of service) using the same set of content. For example, the client device 110 (or SSP, or an auditing process) can verify the digital signature using a public key of the computing system $S_1$ that corresponds to the private key of the computing system $S_1$ used to sign over the content. If verification of the signature fails, then the content signed over has been modified. In addition, the client device 110 (of SSP, or an auditing process) can detect replay attacks if multiple user content responses are received having the same timestamp. In addition, the inclusion of the resource locator for the resource in the set of content that is digitally signed binds the user group content response with this particular presentation with the resource.

The publisher return identifier is an identifier that represents an amount (e.g., but is not the amount itself) that the publisher will receive from the digital component provider for the digital component being presented with publisher's resource. However, the publisher return identifier is meaningless to entities other than the publisher and its SSP 170.

The application 112 transmits a contextual content request to the SSP 170 (212). The contextual content request can include at least a portion of the information in the user group content response and contextual data. For example, the contextual content request can include, from the user group content response, the publisher return identifier and/or the digital component provider identifier. The publisher return identifier enables the SSP 170 to include the digital component selected by the MPC cluster 130 in a contextual content selection process that selects a digital component for presentation with the resource of the publisher based on the full set of contextual data.

The contextual data of the contextual content request can include the same contextual data as the user group-based content request plus additional contextual data, such as the number of digital component slots included in the resource, the location of the digital component slots within the resource, the size of the digital component slots, the type of digital component slots, etc.

The SSP 170 sends contextual content requests to one or more DSPs 150 (214). These contextual content requests can include the contextual data of the contextual content request received from the application 112, but not the information from the user group content response that was included in the contextual content request.

Each DSP 150 can transmit a selection parameter to the SSP 170 (216). For example, each DSP 150 can select one or more digital components based on the contextual data on behalf of the digital component provider(s) represented by the DSP 150. For each digital component, the DSP 150 can also generate or select a selection parameter for the digital component. The DSP 150 can then transmit, to the SSP 170, the selection parameter and data for the digital component (e.g., the signed creative element, the digital component itself, or a resource locator for the digital component).

The SSP 170 selects content based at least in part on the selection parameters received from the DSPs 150 and the publisher return identifier for the digital component selected by the MPC cluster 130. The SSP 170 can determine the magnitude of the selection parameter for the user group-based content request. For example, the SSP 170 can include a lookup table or other appropriate data structure that maps (e.g., links, indexes, or otherwise associates) the selection parameter identifiers of the publisher onto the selection parameters. The lookup table can include an array (e.g., a column) of selection parameter identifiers and, for each selection parameter identifier, a corresponding selection parameter. The selection parameters can be quantized. For example, each selection parameter identifier can correspond to a range of selection parameter values.

The SSP 170 can select the digital component having the highest selection parameter identifier among the selection parameter identifier for the user group-based digital component and the selection parameter identifiers received from the DSPs 150. In some implementations, as described in more detail below, the selection parameter identifier represents a post-share amount that the publisher will receive after a share is assigned to the SSP 170 and/or DSP 150. In this example, the SSP 170 can also determine post-share amounts for the selection parameters received from the DSPs 150 and select the digital component having the highest post-share amount.

The SSP 170 can then transmit the selected digital component and/or the creative snippet for the selected digital component to the client device 110 (220). In turn, the application 112 can present the selected digital component with the publisher's resource (222).

As described above, the contextual content request can include, from the user group content response, the publisher return identifier and/or the digital component provider identifier. This can simplify the adoption of this approach, increase the speed at which the approach is adopted, and simplify the adoption of the approach for existing SSPs that select digital components for presentation based on conventional contextual content requests without the user group-based techniques described in this document. If the contextual content requests include the publisher return identifier but not the digital component provider identifier, the SSP 170 can be modified to include a placeholder (e.g., fictitious) DSP as the DSP for the user group-based digital component when a user group-based digital component is selected. In this example, once an aggregate value to be requested from a DSP (e.g., based on presentation of digital components for the DSP) is received from an aggregation system, e.g., from an application programming interface (API) of an aggregation system, the SSP 170 can replace an amount to be requested for the fictitious DSP with the amount reported by the aggregation system. If the contextual content requests include the digital component provider identifier, the SSP 170 may not have to be modified at all.

In some implementations, the creative snippet can cause the application 112 to transmit a report to an aggregation server that reports the presentation of the digital component for user-group based digital components. This report can include at least a portion of the user group content response for the digital component received from the MPC cluster 130. For example, the report can include the publisher return identifier, the selection parameter identifier, the digital component provider identifier that uniquely identifies the digital component provider that created/published the user group-based digital component, the timestamp indicating a time at which the content selection process was performed to select the user group-based digital component and the digital signature generated by the computing system $S_1$.

FIG. 3 is a swim lane diagram that illustrates an example process 300 for selecting content. Operations of the process 300 can be implemented, for example, by the client device 110, the computing systems $S_1$ and $S_2$ of the MPC cluster 130, one or more DSPs 150, and one or more DSPs 150. Operations of the process 300 can also be implemented as instructions stored on one or more computer readable media which may be non-transitory, and execution of the instructions by one or more data processing apparatus can cause the one or more data processing apparatus to perform the operations of the process 300.

The client device 110 transmits a user group-based content request to the computing system $S_1$ (302). As described above with reference to operation 202 of FIG. 2, the client device 110 can transmit two different content requests, a user group-based content request and a contextual content request in order to select one or more digital components that will be provided to a client device. In this example, an application 112 running on the client device 110 can transmit the user group-based content request to the computing system $S_1$.

The user group-based content request can include some contextual signals, e.g., a resource locator for the resource, such as a URL or URI, a language (e.g., the language in which content is presented by the application rendering the content) and/or coarse geographic location information indicating a coarse location of the client device 110.

The user group-based content request can also include the user group identifiers for the user groups to which the user of the client device 110 is assigned. The user group identifiers can all be sent in one request, e.g., rather than sending an individual request for each user group identifier. The application 112 can encrypt each user group identifier and include the encrypted user group identifiers in the user group-based content request.

In some implementations, the client device 110 encrypts each user group identifier using a public key of the computing system $S_2$ of the MPC cluster 130. A probabilistic public key encryption scheme can be used to encrypt each user group identifier. The probabilistic nature of such encryption schemes provides semantic security in which the encryption scheme encrypts the same plaintext (e.g., user group identifier) to different ciphertext when the encryption scheme is repetitively invoked with the same public key. Examples of probabilistic encryption schemes that can be used to encrypt the user group identifiers is Elliptic Curve P-256 and Elliptic Curve P25519.

For each user group identifier, the application 112 can generate a composite message and encrypt the composite message using a probabilistic public key based encryption algorithm with the public key of the computing system $S_2$. The composite message for a user group identifier can include the user group identifier, an application public key (e.g., a public key of the application 112 sending the user group-based content request, which corresponds to an application private key maintained confidentially by the application 112), an SRR for the user group identifier, and a digital signature. The application 112 can generate the digital signature based on the other content of the composite message, e.g., by signing over the user group identifier, the application public key, and the SRR using the application private key.

The application 112 can then encrypt the composite message for each user group identifier using an encryption key of the computing system $S_2$. This encryption process can include applying a probabilistic asymmetric key algorithm on the composite message using the public key of the computing system $S_2$. Encrypting each user group identifier using a key of the computing system $S_2$ prevents the computing system $S_1$ that receives the user group-based content request from joining the user group identifier with the contextual signals included in the user group-based content request.

The digital signature enables the computing system $S_2$ to detect fraud. For example, if verification of the digital signature fails, then the content of the composite message has been modified after the digital signature was generated.

The SRR also enables the computing system $S_2$ to detect fraud, e.g., user group membership fraud. Each composite message can include a different SRR obtained for its user group identifier. That is, the user group-based content request can include a respective SRR for each user group identifier to which the user is assigned. Each composite message can also include a different application public key, which is used to obtain the SRR for the user group identifier. This prevents the computing system $S_2$ from inferring that a set of user group identifiers are from the same application 112, protecting user privacy by not enabling the computing system $S_2$ to correlate all the user groups to which a user belongs.

Each SRR can include a publisher origin (e.g., the eTLD+1 domain of the computing system $S_2$), a binding, the eTLD+1 for a trust token issuer that issued a trust token that was redeemed to obtain the SRR, a redemption timestamp that indicates a time at which the trust token was redeemed, and a digital signature signed by the trust token issuer. The signature enables a recipient to verify that the trust token issuer evaluated the client device and deemed the device trustworthy and that the content of the SRR has not been modified. The trust token issuer can generate the digital signature using a private key and the other content of the SRR.

The binding can bind the SRR to both the user group identifier and the application public key for the user group identifier. This prevents the SRR from being used by other applications (e.g., on other devices) or for other group identifiers. In some implementations, the binding is a cryptographic hash of the user group identifier and the application public key for the user group identifier. In some implementations, the binding is a hash-based message authentication code (HMAC) of the user group identifier and the application public key for the user group identifier.

The application 112 can request an SRR for each user group identifier from a trust token issuer. The trust token issuer can issue trust tokens based on the level of trustworthiness of the client device 110 and/or the application 112. The request can include, for each user group identifier, a respective trust token and the crypto hash (or HMAC) of the public key and the user group identifier. In some implementations, the application 112 generates the cryptographic hash for each user group identifier using a cryptographic function. For example, the application 112 can generate, for a user group identifier, a HMAC of the user group identifier and its respective application public key.

By sending the cryptographic hash (e.g., HMAC in some implementations) rather than the user group identifier to the trust token issuer, the user groups to which the user is assigned is not leaked to the trust token issuer. The trust token issuer can generate the SRR for each user group identifier, including generating the digital signature using a private key of the trust token issuer. This enables recipients of the SRR to detect if the content of the SRR has changed by attempting to verify the digital signature using a public key corresponding to the trust token issuer's private key.

To prevent the computing system $S_1$ from learning the number of user groups to which the user of the client device 110 is assigned, the application 112 that transmits the request can encrypt fake user group identifiers and insert the encrypted fake user group identifiers in the user group based content request. For example, the application 112 can insert an arbitrary or periodically changing number of encrypted fake user group identifiers in the user group-based content request. Each fake user group identifier can be encrypted using the public key of the computing system $S_2$ of the MPC cluster 130. The fake user group identifiers can have a common value, e.g., a value of zero or some other constant.

Generating user group content requests in this manner prevents the computing system $S_1$ from correlating the user group identifiers for each user (by encrypting the user group identifiers) and learning the number of user groups to which each user is assigned (using fake identifiers). As the MPC cluster 130 can receive many requests from many different client devices, these techniques can prevent the computing systems $S_1$ and $S_2$ from learning about the user group membership of each of the users.

The user group content request can also include an SRR for the request itself, e.g., in addition to the encrypted SRR for each user group identifier. This enables the computing system $S_1$ to verify that the user group content request was sent by a trusted client device. The computing system $S_1$ can verify this SRR after the user group content request is received from the application 112. For example, the computing system $S_1$ can use the public key of the trust token issuer to verify the signature of the SRR, and therefore ensure that the content of the SRR has not been modified since the signature was generated. The computing system $S_1$ can also ensure that the redemption timestamp is recent, e.g., within a threshold amount of time of a time at which the user group-based content request is received.

The computing system $S_1$ applies k-anonymity on the contextual signals included in the user group-based content request (304). K-anonymity techniques can be used to ensure that the contextual signals for each user for which an application sends user group-based content requests are shared among at least K users and therefore cannot uniquely identify a single user or a small group of users. When applying k-anonymity on the contextual signals, the computing system $S_1$ can use the contextual signals received from multiple client devices, e.g., of many different users from which user group content requests have been received, over a period of time, e.g., that day, week, month, etc.

The computing system $S_1$ can use the cryptographic hash included in each SRR (e.g., the cryptographic hash of the user group identifier and the application public key) to determine the number of unique applications that sent a particular set of contextual signals. The computing system $S_1$ can compare the number of unique applications to an anonymity threshold and, if the number meets or exceeds the anonymity threshold, determine that the set of contextual signals satisfies k-anonymity. If a set of contextual signals does not satisfy k-anonymity, e.g., due to the number of unique applications being less than the anonymity threshold, the computing system $S_1$ can respond to the user group-based content request without a digital component. The anonymity threshold can be based on the parameter k of the target k-anonymity.

In another example, the computing system $S_1$ can apply k-anonymity to each contextual signal included in the user group-based content request. For example, the computing system $S_1$ can compare the number of unique applications from which an individual contextual signal was received to an anonymity threshold. If the number of unique applications meets or exceeds the anonymity threshold, the individual contextual signal satisfies k-anonymity. The computing system $S_1$ can ignore (e.g., delete) contextual signals that do not satisfy k-anonymity but continue the process with contextual signals that do satisfy k-anonymity.

The computing system $S_1$ creates a unique request identifier for the user group-based content request received from the application 112. This request identifier can be a composite message that includes a nonce (e.g., an arbitrary, pseudorandom, or random number) and a resource locator for the resource with which the selected content will be presented. For example, the request identifier can include the nonce and the domain (e.g., example.com), URL, or URI of the resource. This enables the computing system $S_1$ to correlate selection parameter identifiers received from the computing system $S_2$ and use the selection parameter identifiers to select a digital component to return to the application 112, as described below.

The computing system $S_1$ can then send, for each user group identifier received from the application 112 (e.g., each encrypted composite message received from the application 112 since the computing system $S_1$ does not have access to the plaintext user group identifiers), a respective request to the computing system $S_2$ (308). Prior to generating the request(s), the computing system $S_1$ can encrypt the request identifier and the contextual signals received in the user group-based content request received from the application 112 using a secret key owned by the computing system $S_1$. The encryption of the request identifier can employ a probabilistic symmetric encryption algorithm on the plaintext of the request identifier using the key. Similarly, the encryption of the contextual signals can employ a probabilistic symmetric encryption algorithm on the plaintext of the contextual signals using the key. Each request can include the encrypted request identifier, the encrypted contextual signals, and the encrypted composite message for the user group identifier.

By sending one request per user group identifier, the computing system $S_2$ cannot infer which user group identifiers are from the same application 112 or the same client device 110. For example, the computing system $S_1$ can send requests to the computing system $S_2$ for many different client devices at the same time or within a short time period, e.g., within seconds, milliseconds, or minutes. With many different requests being sent for many different client devices and each being for one user group identifier, the computing system $S_2$ would be unable to correlate user group identifiers for a particular client device.

The computing system $S_2$ enforces k-anonymity on the user group identifiers (310). The computing system $S_2$ can enforce k-anonymity on the user group identifiers received from the application 112 in the user group-based content request so that uncommon user group identifiers cannot be correlated to the user of the client device 110.

To enforce k-anonymity on the user group identifiers, the computing system $S_2$ decrypts the composite message of each request using its private key corresponding to the public key used to encrypt the composite message. As described above the composite message for a user group identifier can include the user group identifier, an application public key (e.g., a public key of the application 112 sending the user group-based content request, which corresponds to an application private key maintained confidentially by the application 112), an SRR for the user group identifier, and a digital signature.

The computing system $S_2$ can then validate the composite message. This can include multiple validations. The computing system $S_2$ can attempt to validate the digital signature using the application public key to ensure that the other content of the composite message has not been modified. The computing system $S_2$ can attempt to validate the freshness of the SRR, e.g., by ensuring that the time represented by the timestamp of the SRR is within a threshold amount of time of a current time at which the validation is performed. The computing system $S_2$ can attempt to validate the SRR's digital signature using the trust token issuer's public key to ensure that the content of the SRR has not been modified. The computing system $S_2$ can attempt to validate the publisher origin of the SRR to ensure that the publisher origin of the SRR matches the eTLD+1 of the computing system $S_2$. The computing system $S_2$ can attempt to validate the binding value, e.g., by ensuring that the binding value of the SRR is the cryptographic hash of the user group identifier and the application public key. For example, the computing system $S_2$ can re-compute the cryptographic hash using the same cryptographic function and key and compare this hash to the binding value.

These validations can be used to detect potentially untrustworthy applications, e.g., the application 112, or an untrustworthy computing system $S_1$. If all of the validations succeed, the computing system $S_2$ can enforce k-anonymity on the user group identifiers. To determine whether an individual user group identifier satisfies k-anonymity, the computing system $S_1$ can compare the number of requests that included the user group identifier, e.g., the number of applications that have sent a request that includes the user group identifier, to an anonymity threshold. If the number of requests meets or exceeds the anonymity threshold, the computing system $S_1$ can determine that the user group identifier satisfies k-anonymity. If a user group identifier is fake (e.g., a fake identifier sent by the application 112) or does not satisfy k-anonymity, the computing system $S_2$ can ignore the request and not send a return request to the computing system $S_1$ for that user group identifier.

For user group identifiers that are not fake and do pass k-anonymity, the computing system $S_2$ transmits a return request to the computing system $S_1$ (312). This return request for a user group identifier can include the encrypted contextual signals received for the user group identifier (e.g., the contextual signals encrypted using the key of the computing system $S_1$ that was received in the request sent to the computing system $S_2$), a twice-encrypted request identifier, and the decrypted user group identifier. That is, when a user group identifier of an encrypted composite message received in a request received from the computing system $S_1$ passes k-anonymity and is not fake, the computing system $S_2$ can encrypt the already encrypted request identifier (encrypted using the secret key of the computing system $S_1$) using a secret key of the computing system $S_2$ (which can also be probabilistic symmetric key encryption). The computing system $S_2$ can then generate and transmit a return request that includes this twice-encrypted request identifier, the encrypted contextual signals that was received in the request, and the plaintext value of the user group identifier (that was received in encrypted form with the request form the computing system $S_1$).

The computing system $S_1$ applies DSP/digital component provider exclusion to each return request (314). The computing system $S_1$ can decrypt the encrypted contextual signals using its secret key to recover the contextual signals in plaintext. These contextual signals can include the domain, URL, or URI of the publisher resource with which the selected content will be presented. The computing system $S_1$ can compare this information to a lookup table that maps domains, URLs, or URIs to DSPs and/or digital component providers that are eligible to provide a digital component for presentation with the publisher's resource. The SSP 170 for the publisher can upload the lookup table to the computing system $S_1$. This enables the computing system $S_1$ to implement a DSP filter, which can significantly reduce the number of requests, e.g., the number of queries per second, sent to the DSP's computers and will therefore reduce network usage and the burden of servicing the requests by the DSP's computers.

In some implementations, the user group identifiers can encode sufficient information to specify the set of DSPs and/or digital component providers for which the user group identifier is intended. The computing system $S_1$ can determine the union of the set of DSPs and/or digital component providers specified by the user group identifier and the set of DSPs and/or digital components that survive the lookup table filtering.

The computing system $S_1$ generates and transmits a user group-based content selection parameter request to one or more DSPs 150 (316). For each return request received from the computing system $S_2$, the computing system $S_1$ can send a user group-based content request to each DSP in the union of the two sets, including the DSPs for each digital component provider in the union of the two sets. Each of these selection parameter requests can include the twice-encrypted user group identifier of the return request, the user group identifier of the return request, and the contextual signals in plaintext corresponding to the return request. Thus, for the user group-based content request received from the client device 110, the computing system $S_1$ can send, to each of the one or more DSPs 150, a respective selection parameter request for each user group identifier of the user group-based content request that satisfied k-anonymity.

Each DSP 150 can transmit a selection parameter to the computing system $S_2$ (318). For example, each DSP 150 can select one or more digital components based on the user group identifier and/or the contextual data on behalf of the digital component provider(s) represented by the DSP 150. For each digital component, the DSP 150 can also generate or select a selection parameter for the digital component based on the user group identifier and/or the contextual data. The DSP 150 can then generate selection parameter response that includes the twice-encrypted request identifier received in the selection parameter request, the signed creative element for the selected digital component, the determined selection parameter, and a digital component provider identifier that uniquely identifies the digital component provider that created/published the selected digital component. The DSP 150 can then transmit the selection parameter response to the computing system $S_2$.

The computing system $S_2$ applies k-anonymity on the selection parameters received from the DSPs 150 (320). In some implementations, the MPC cluster 130 uses multiple lookup tables to enforce k-anonymity and maintain the confidentiality of pre- and post-share selection parameters and share amount allocated to the SSP 170. The selection parameters received from the DSPs 150 can be pre-share selection parameters. For example, the SSP 170 for the publisher can upload a first lookup table (Table 1) that includes selection parameter boundaries and corresponding selection parameter identifiers.

TABLE 1

| Boundary | Selection Parameter Identifier | Semantics |
|---|---|---|
| 0 | | N/A |
| $P_1$ | Parameter_ID$_0$ | If the selection parameter is in $[0, P_1]$, assign Parameter_ID$_0$ |
| $P_2$ | Parameter_ID$_1$ | If the selection parameter is in $[P_1, P_2]$, assign Parameter_ID$_1$ |
| . . . | . . . | |
| $P_n$ | Parameter_ID$_{n-1}$ | If the selection parameter is in $[P_{n-1}, P_n]$, assign Parameter_ID$_{n-1}$ |
| ∞ | Parameter_ID$_n$ | If the selection parameter is in $[P_n, ∞]$, assign Parameter_ID$_n$ |

In this table, the boundaries define the high limit of each range. If a selection parameter is within a particular range, the computing system $S_2$ assigns the selection parameter identifier for the range to the selection parameter.

The selection parameter identifier can have no semantics other than an arbitrary unique identifier of a particular selection parameter range that is known only to the SSP 170 and the computing system $S_2$. The computing system $S_2$ can access this lookup table and identify the selection parameter identifier that corresponds to a selection parameter received from a DSP 150. The computing system $S_2$ can identify the selection parameter identifier for each selection parameter received from the DSPs 150 in the selection parameter responses.

The computing system $S_2$ can then enforce k-anonymity on one or more of the signed creative elements of the selection parameter responses, the selection parameter identifiers, and the digital component provider identifiers. This k-anonymity technique can involve the selection parameter responses for user group-based content requests received by the MPC cluster 130 from many different client devices, including the selection parameter responses generated based on the user group-based content request received from the client device 110. To determine whether an individual selection parameter satisfies k-anonymity, the computing system $S_2$ can compare the number of selection parameter responses that include the individual selection parameter to an anonymity threshold. If the number meets or exceeds the anonymity threshold, the computing system $S_2$ can determine that the selection parameter satisfies k-anonymity. The computing system $S_2$ can ignore any selection parameter that does not satisfy k-anonymity.

For each selection parameter that satisfies k-anonymity, the computing system $S_2$ generates and transmits, to the computing system $S_1$, a selection parameter element (322). The selection parameter element for a selection parameter can include the encrypted request identifier corresponding to the selection parameter, the signed creative element corresponding to the selection parameter, the selection parameter identifier corresponding to the selection parameter, and/or the digital component provider that created/published the digital component corresponding to the selection parameter. For example, the computing system $S_2$ can decrypt the twice-encrypted request identifier using its secret key to recover the encrypted request identifier that is encrypted using the secret key of the computing system $S_1$.

The computing system $S_1$ applies creative exclusions to the selection parameter elements (324). The computing system $S_1$ can decrypt the request identifier of each selection parameter element using its secret key to recover each request identifier in plaintext. As described above, each request identifier is a composite message that includes a nonce and a resource locator for the resource with which the selected content will be presented. The resource locator can be used to apply the creative exclusions.

As described above, a publisher may not allow digital components having particular properties (e.g., having content related to particular categories) to be presented with its resources. The SSP 170 for the publisher can define a set of digital component properties to support creative exclusion. Such properties can be represented as a finite discrete set: $P=\{P_1, P_2, \ldots, P_n\}$. The SSP 170 can optionally encrypt these properties using a deterministic symmetric encryption algorithm using the SSP's secret encryption key, similar to how the properties can be encrypted for inclusion in the signed creative elements.

The computing system $S_1$ can periodically obtain the set of properties for each publisher from the SSP 170 for the publisher. The SSP 170 can store the set of properties for each publisher locally, e.g., in a cache. For example, the computing system $S_1$ can maintain a data structure similar to Table 2 below.

TABLE 2

| Resource Locator | Creative Exclusion |
|---|---|
| example.com/mainpage | $P_1$, $P_{41}$, $P_{90}$ |
| example.com/secondpage | $P_7$ |

In this table, each property (e.g., $P_1$, $P_{41}$, etc.) can be a category of content of digital components, an object depicted by a digital component, or other property of digital components. For each resource locator, the set of properties in the creative exclusion column indicates the properties that, if assigned to a digital component, indicates that the digital component should not be provided for presentation with the resource corresponding to the resource locator.

To apply the creative exclusion for a selection parameter element, the computing system $S_1$ can obtain, from the signed creative element, the set of properties included in the metadata of the signed creative element. The computing system $S_1$ can then compute the intersection of the set of properties of the signed creative element with the set of properties defined as creative exclusions for the resource locator of the request identifier included in the selection parameter element. If the intersection is empty, the digital component of the signed creative element is eligible for presentation with the resource corresponding to the resource locator. Otherwise, the computing system $S_1$ can ignore the creative element and its selection parameter element.

The computing system $S_1$ selects content to provide to the application 112 in response to the user group-based content request (326). The user group-based content request received from the application 112 has a corresponding request identifier based on its nonce and the resource locator of the resource for which content is being selected. After applying the creative exclusions to the selection parameter elements with this request identifier, the computing system $S_1$ can collect the set of all of the selection parameter elements received with this request identifier. The computing system $S_1$ can then select a digital component based on the selection parameter identifiers included in the set of selection parameter elements.

In some implementations, a publisher is allocated a portion of a selection parameter for a selected digital component, with shares going to the SSP 170 and/or the DSP 150. The selection parameter can represent a monetary amount and each share can be a portion of this monetary amount. The selection parameter identifiers in the selection parameter elements correspond to the pre-share selection parameters. The ways in which the shares are determined are confidential information that should be protected. To do so, the computing system $S_1$ can use two lookup tables, which prevents the computing system $S_1$ from obtaining information about the way in which shares are determined. In other implementations, encryption techniques, such as homomorphic encryption could be used on the selection parameters. However, this would result in significantly more latency, required computing resources (e.g., CPU cycles) to encrypt and decrypt the information, more complexity in troubleshooting, and significantly reduced efficiency relative to using lookup tables.

A first lookup table (Table 3 below) can map resource locators to digital component identifiers and share codes. The SSP 170 can upload this lookup table to the computing system $S_1$. The share codes can be meaningless to entities other than the SSP 170.

TABLE 3

| Resource Locator | Digital Component Provider Identifier | Share Code |
|---|---|---|
| example.com/mainpage | 76 | A739 |
| example.com/secondpage | 91 | 320od |

For the user group-based content request, the computing system $S_1$ can lookup the share code for each signed creative element in the set of selection parameter elements. The computing system $S_1$ can lookup the share code for a signed creative element using the resource locator of the request identifier and the digital component identifier of the signed creative element.

The computing system $S_1$ can then use a second lookup table (Table 4 below) to lookup the selection parameter identifier for each signed creative element in the set of selection parameter elements. The SSP 170 can also upload this lookup table to the computing system $S_1$.

TABLE 4

| Publisher Return Identifier | Share Code | Selection Parameter Identifier |
|---|---|---|
| 1 | 1683b | Parameter_ID$_6$ |
| 2 | 38r4j | Parameter_ID$_1$ |
| . . . | . . . | |
| m | D2dv | Parameter_ID$_{93}$ |

The publisher return identifier corresponds to the share of the selection parameter that the publisher will receive. The value of the publisher return identifier can be monotonic, i.e., the larger the publisher return identifier, the greater the amount that the publisher will receive.

The computing system $S_1$ can lookup the publisher return identifier for each signed creative element in the set of selection parameter elements using the share code for the creative element (identified using Table 3) and the selection parameter identifier for the creative element.

Among all eligible creative elements with the same request identifier, e.g., each creative element in the set of selection parameter elements, the computing system $S_1$ selects the signed creative element corresponding to the largest publisher return identifier.

The computing system $S_1$ transmits a user group content response to the application 112 (328). As described above with reference to operation 210 of FIG. 2, the user group content response can include a set of content that includes the selected signed creative element, the publisher return identifier for the selected signed creative element, the digital component provider identifier for the digital component of the signed creative element, and a timestamp indicating a time at which the content selection process was performed to select the signed creative element. The user group content response can also include a digital signature generated by the computing system $S_1$. After receiving this user group content request, the application 112 can transmit a contextual content request to the SSP 170 and continue the process 200 of FIG. 2 to select a final digital component for presentation with the resource.

Figure 4:
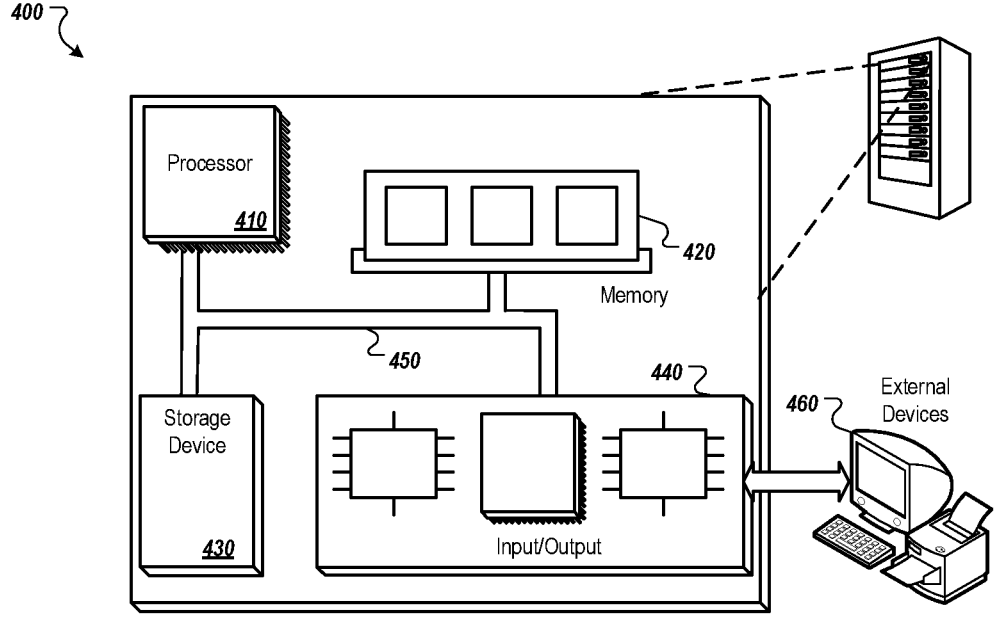
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:

receiving, by a first multi-party computation (MPC) computing system and from a client device, a content request comprising a set of encrypted user group identifiers, wherein each encrypted user group identifier is encrypted using a first encryption key of a second MPC computing system;

for each encrypted user group identifier, transmitting a request to the second MPC computing system to decrypt the encrypted user group identifier, the request comprising the encrypted user group identifier;

for each user group identifier that satisfies a k-anonymity process performed by the second MPC computing system that ensures that requests that include the user group identifier have been received from at least a threshold number of different applications before decrypting the user group identifier:

receiving, by the first MPC computing system from the second MPC computing system, a plaintext value of the user group identifier, wherein the second MPC computing system decrypts each encrypted user group identifier that satisfies the k-anonymity process, and wherein the second MPC computing system ensures that requests that include the user group identifier have been received from at least a threshold number of different applications before decrypting the user group identifier by (i) determining a number of different applications from which requests have been received that include the user group identifier and (ii) comparing the number of requests to the threshold; and transmitting, by the first MPC computing system, a selection parameter request to one or more platforms different from the first and second MPC computing systems, the selection parameter request comprising the plaintext value of the user group identifier and requesting selection parameters for use in selecting a digital component to provide to the client device in response to the content request;

receiving, by the first MPC computing system and from the second MPC computing system, a set of selection parameter elements that each comprise a creative element for a corresponding digital component and a selection parameter identifier for the digital component;

selecting, by the first MPC computing system, a given digital component based on the selection parameter identifiers; and transmitting, by the first MPC computing system and to the client device, the creative element for the digital component.

2. The method of claim 1, wherein the content request comprises a resource locator for a resource for which a digital component is being requested, the method further comprising:

generating, by the first MPC computing system, a request identifier based on the resource locator and a nonce corresponding to the content request; and encrypting, by the first MPC computing system, the request identifier, wherein the request comprises the encrypted request identifier.

3. The method of claim 2, wherein:

receiving the plaintext value of each user group identifier that satisfies the k-anonymity process comprises receiving a return request for each user group identifier that satisfies the k-anonymity process, each return request comprising the user group identifier and a twice-encrypted request identifier encrypted generated by the second MPC computing system by encrypting the encrypted request identifier using a second encryption key of the second MPC computing system;

each selection parameter request comprises the twice-encrypted request identifier; and each selection parameter element comprises the encrypted request identifier generated by the second MPC computing system by decrypting the twice-encrypted request identifier after receiving, from a platform, the twice-encrypted request along with the creative element and the selection parameter identifier of the selection parameter element.

4. The method of claim 3, wherein the second MPC computing system:

receives, from each of the one or more platforms, a selection parameter response comprising the twice-encrypted request identifier, a respective creative element for a respective digital component, a selection parameter for the respective digital component, and a digital component provider identifier that publishes the respective digital component;

identifies, for each selection parameter response, a corresponding selection parameter identifier based on a range of selection parameter values in which the selection parameter of the selection parameter is included; and generates the selection parameter elements based on the selection parameter responses and the selection parameter identifiers.

5. The method of claim 1, wherein the content request comprises, for each user group identifier, an encrypted composite message, the encrypted composite message comprising an encrypted version of a composite message comprising the user group identifier, an application public key for an application of the client device that initiated the content request and a Signed Redemption Record issued by a trust token issuer in response to determining that the client device is trustworthy.

6. The method of claim 1, wherein the content request comprises contextual signals, the method further comprising:

determining that the contextual signals satisfy k-anonymity by determining that, for each contextual signal, at least a threshold number of content requests d that include the contextual signal have been received; and in response to determining that the contextual signals satisfy k-anonymity:

encrypting, by the first MPC computing system, the contextual signals; and including, in the request, each contextual signal that satisfies k-anonymity.

7. The method of claim 1, wherein the content request comprises a resource locator for a resource for which a digital component is being requested, wherein the method further comprises:

identifying, in each creative element, a first set of properties for the corresponding digital component; and identifying, in a lookup table, a second set of excluded properties excluded by a publisher of the resource;

wherein selecting, by the first MPC computing system, a given digital component based on the selection parameter comprises:

determining, for each creative element, whether one or more properties in the first set of properties for the creative element matches an excluded property; and excluding each creative element having at least one property that matches an excluded property.

8. The method of claim 1, wherein selecting, by the first MPC computing system, a given digital component based on the selection parameter identifiers comprises:

for each selection parameter element:

identifying, in a first lookup table, a share code for the creative element of the selection parameter element based on a resource locator for a resource and a digital component identifier to a digital component provider that publishes the corresponding digital component of the creative element; and identifying, in second lookup table, a publisher return identifier based on the share code and the selection parameter identifier of the selection parameter element; and selecting, as the given digital component, a digital component of a given selection parameter element having a highest publisher return identifier.

9. The method of claim 8, wherein transmitting, by the first MPC computing system and to the client device, the creative element for the digital component comprises transmitting a content request result comprising the creative element, the publisher return identifier for the given selection parameter element, the digital component provider identifier for the given digital component, a timestamp indicating a time at which the given digital component was selected, and a digital signature.

10. The method of claim 9, wherein:

the client device transmits a second content request to a second platform;

the second content request result comprises the content request result and additional contextual signals; and the second platform selects a second digital component for presentation at the client device from among a set of digital components comprising the given digital component and one or more digital components selected based on the additional contextual signals.

11. A system comprising:

one or more processors; and one or more storage devices storing instructions that, when executed by the one or more processors, cause the one or more processors to perform operations comprising:

receiving, by a first multi-party computation (MPC) computing system and from a client device, a content request comprising a set of encrypted user group identifiers, wherein each encrypted user group identifier is encrypted using a first encryption key of a second MPC computing system;

for each encrypted user group identifier, transmitting a request to the second MPC computing system to decrypt the encrypted user group identifier, the request comprising the encrypted user group identifier;

for each user group identifier that satisfies a k-anonymity process performed by the second MPC computing system that ensures that requests that include the user group identifier have been received from at least a threshold number of different applications before decrypting the user group identifier:

receiving, by the first MPC computing system from the second MPC computing system, a plaintext value of the user group identifier, wherein the second MPC computing system decrypts each encrypted user group identifier that satisfies the k-anonymity process, and wherein the second MPC computing system ensures that requests that include the user group identifier have been received from at least a threshold number of different applications before decrypting the user group identifier by (i) determining a number of different applications from which requests have been received that include the user group identifier and (ii) comparing the number of requests to the threshold; and transmitting, by the first MPC computing system, a selection parameter request to one or more platforms different from the first and second MPC computing systems, the selection parameter request comprising the plaintext value of the user group identifier and requesting selection parameters for use in selecting a digital component to provide to the client device in response to the content request;

receiving, by the first MPC computing system and from the second MPC computing system, a set of selection parameter elements that each comprise a creative element for a corresponding digital component and a selection parameter identifier for the digital component;

selecting, by the first MPC computing system, a given digital component based on the selection parameter identifiers; and transmitting, by the first MPC computing system and to the client device, the creative element for the digital component.

12. The system of claim 11, wherein the content request comprises a resource locator for a resource for which a digital component is being requested, the operations comprising:

generating, by the first MPC computing system, a request identifier based on the resource locator and a nonce corresponding to the content request; and encrypting, by the first MPC computing system, the request identifier, wherein the request comprises the encrypted request identifier.

13. The system of claim 12, wherein:

receiving the plaintext value of each user group identifier that satisfies the k-anonymity process comprises receiving a return request for each user group identifier that satisfies the k-anonymity process, each return request comprising the user group identifier and a twice-encrypted request identifier encrypted generated by the second MPC computing system by encrypting the encrypted request identifier using a second encryption key of the second MPC computing system;

each selection parameter request comprises the twice-encrypted request identifier; and each selection parameter element comprises the encrypted request identifier generated by the second MPC computing system by decrypting the twice-encrypted request identifier after receiving, from a platform, the twice-encrypted request along with the creative element and the selection parameter identifier of the selection parameter element.

14. The system of claim 13, wherein the second MPC computing system:

receives, from each of the one or more platforms, a selection parameter response comprising the twice-encrypted request identifier, a respective creative element for a respective digital component, a selection parameter for the respective digital component, and a digital component provider identifier that publishes the respective digital component;

identifies, for each selection parameter response, a corresponding selection parameter identifier based on a range of selection parameter values in which the selection parameter of the selection parameter is included; and generates the selection parameter elements based on the selection parameter responses and the selection parameter identifiers.

15. The system of claim 11, wherein the content request comprises, for each user group identifier, an encrypted composite message, the encrypted composite message comprising an encrypted version of a composite message comprising the user group identifier, an application public key for an application of the client device that initiated the content request and a Signed Redemption Record issued by a trust token issuer in response to determining that the client device is trustworthy.

16. The system of claim 11, wherein the content request comprises contextual signals, the operations comprising:

determining that the contextual signals satisfy k-anonymity by determining that, for each contextual signal, at least a threshold number of content requests that include the contextual signal have been received; and in response to determining that the contextual signals satisfy k-anonymity:

encrypting, by the first MPC computing system, the contextual signals; and including, in the request, each contextual signal that satisfies k-anonymity.

17. The system of claim 11, wherein the content request comprises a resource locator for a resource for which a digital component is being requested and wherein the operations comprise:

identifying, in each creative element, a first set of properties for the corresponding digital component; and identifying, in a lookup table, a second set of excluded properties excluded by a publisher of the resource;

wherein selecting, by the first MPC computing system, a given digital component based on the selection parameter comprises:

determining, for each creative element, whether one or more properties in the first set of properties for the creative element matches an excluded property; and excluding each creative element having at least one property that matches an excluded property.

18. The system of claim 11, wherein selecting, by the first MPC computing system, a given digital component based on the selection parameter identifiers comprises:

for each selection parameter element:

identifying, in a first lookup table, a share code for the creative element of the selection parameter element based on a resource locator for a resource and a digital component identifier to a digital component provider that publishes the corresponding digital component of the creative element; and identifying, in second lookup table, a publisher return identifier based on the share code and the selection parameter identifier of the selection parameter element; and selecting, as the given digital component, a digital component of a given selection parameter element having a highest publisher return identifier.

19. The system of claim 18, wherein transmitting, by the first MPC computing system and to the client device, the creative element for the digital component comprises transmitting a content request result comprising the creative element, the publisher return identifier for the given selection parameter element, the digital component provider identifier for the given digital component, a timestamp indicating a time at which the given digital component was selected, and a digital signature.

20. A non-transitory computer readable medium storing instructions that, when executed by one or more processors, cause the one or more processors to perform operations comprising:

receiving, by a first multi-party computation (MPC) computing system and from a client device, a content request comprising a set of encrypted user group identifiers, wherein each encrypted user group identifier is encrypted using a first encryption key of a second MPC computing system;

for each encrypted user group identifier, transmitting a request to the second MPC computing system to decrypt the encrypted user group identifier, the request comprising the encrypted user group identifier;

for each user group identifier that satisfies a k-anonymity process performed by the second MPC computing system that ensures that requests that include the user group identifier have been received from at least a threshold number of different applications before decrypting the user group identifier:

receiving, by the first MPC computing system from the second MPC computing system, a plaintext value of the user group identifier, wherein the second MPC computing system decrypts each encrypted user group identifier that satisfies the k-anonymity process, and wherein the second MPC computing system ensures that requests that include the user group identifier have been received from at least a threshold number of different applications before decrypting the user group identifier by (i) determining a number of different applications from which requests have been received that include the user group identifier and (ii) comparing the number of requests to the threshold; and transmitting, by the first MPC computing system, a selection parameter request to one or more platforms different from the first and second MPC computing systems, the selection parameter request comprising the plaintext value of the user group identifier and requesting selection parameters for use in selecting a digital component to provide to the client device in response to the content request;

receiving, by the first MPC computing system and from the second MPC computing system, a set of selection parameter elements that each comprise a creative element for a corresponding digital component and a selection parameter identifier for the digital component;

selecting, by the first MPC computing system, a given digital component based on the selection parameter identifiers; and transmitting, by the first MPC computing system and to the client device, the creative element for the digital component.

\* \* \* \* \*